No. 637,038. Patented Nov. 14, 1899.
P. T. SIEVERT.
PROCESS OF PUNCHING OR STAMPING OUT GLASS ARTICLES.
(Application filed Feb. 3, 1899.)
(No Model.)
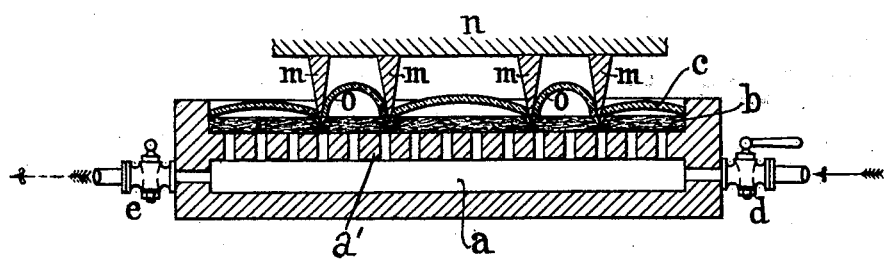
Witnesses:-
Edward Vieser.
George Barry Jr.
Inventor.
Paul Theodor Sievert
by attorneys
Brown & Seward

UNITED STATES PATENT OFFICE.

PAUL THEODOR SIEVERT, OF DRESDEN, GERMANY.

PROCESS OF PUNCHING OR STAMPING OUT GLASS ARTICLES.

SPECIFICATION forming part of Letters Patent No. 637,038, dated November 14, 1899.

Application filed February 3, 1899. Serial No. 704,353. (No specimens.)

*To all whom it may concern:*

Be it known that I, PAUL THEODOR SIEVERT, a subject of the King of Saxony, and a resident of Dresden, in the Kingdom of Saxony, German Empire, have invented a new and useful Improvement in Processes for Punching or Stamping Out Glass Articles, of which the following is a specification.

The patents obtained by me for Great Britain and bearing date, respectively, October 6, 1892, No. 17,848, and May 11, 1893, No. 9,466, and for Germany, Nos. 67,292 and 71,635, relate to a process for stamping or punching out glass articles out of a plastic layer of glass by means of sharp-edged punches and dies. This process consists in the separation of stamped-out objects which are united in the glass plate or layer by grinding away the back of the plate. Hitherto a perfect and thorough stamping and punching out of the separate objects or articles by the processes in use has been unattainable, as the sharp edges of the punches and dies used against the metal bed-plate were rapidly destroyed.

By the process constituting the subject-matter of the present invention a perfect stamping out of the objects is attained. This I effect by the employment in place of a metal bed-plate of a mat of soft fibrous material, preferably kept damp or moist, as is described in my English patent, dated July 6, 1898, No. 14,873, for the manufacture of glass plates. This fibrous mat I make, preferably, of asbestos and place it upon a metal bed-plate pierced with holes and forming the cover of a water-tight chamber. Into this chamber water is introduced and passed through the holes in the bed-plate to the fibrous material, or instead of water steam may be used, which condenses in the asbestos mat. If a sufficient quantity of moisture penetrates the fibrous mat and if the sharp outline-cutting edges of the dies or punches are pressed against and into the plastic glass mass laid on the mat, not only can the articles be cut, stamped, or punched out of the glass without injury to the sharp edges of the punches or dies, but there will be a squeezing out of moisture from the asbestos by reason of the pressure caused by the dies. This water will be evaporated by the heat of the molten or plastic glass mass and the steam will cause a bulging up of the glass within the dividing-lines of the punch or die. Consequently the punched-out articles will be concave below and convex above, as is the case in the process of glass-blowing according to German Patent No. 84,506. The principal advantages of this process are the saving in glass and in the cost of grinding away the connecting glass film or ribs at the back of the slab. The bulging up of the plastic glass mass outside of the outlines of the punches or dies does not injure or prejudice the formation of the desired convex objects.

In the accompanying drawing a sample apparatus for carrying out this process is illustrated.

$a$ is a water-tight chamber the top or cover of which consists of a perforated bed-plate $a'$. On this perforated bed-plate lies the fibrous mat $b$. $c$ is the molten or plastic glass mass spread or laid thereon. Into the chamber $a$ water or steam is admitted. The pressure of the fluid in the chamber can be regulated by the cocks or valves $d\ e$.

$n$ is the punch or die, and $m\ m$ are the cutting edges thereof. When the sharp edges $m$ of the punch or die $n$ cut through the plastic glass mass to or partly through the asbestos mat $b$, steam-pressure from below the stamped-out objects $o\ o$ bulges them up and makes them concave below and convex above.

The plastic glass mass can be smoothed or evened down before the operation of punching or stamping by the application of plate or roller pressure.

Having now described my invention and the manner in which the same is to be carried out, I claim as my invention—

1. The process of cutting or punching out glass objects from a plastic glass sheet consisting in subjecting one face of the sheet to a cutting operation in outlines corresponding with the forms of such objects while the opposite face is subject to pressure of a fluid, substantially as herein described.

2. The process of cutting or punching out glass objects from a hot plastic glass sheet consisting in subjecting one face of the sheet to a cutting operation in outlines corresponding with the forms of such objects while the opposite face is subject to the pressure of steam generated by the heat of said sheet, substantially as herein described.

In testimony that I claim the foregoing as my invention I have signed my name, in presence of two witnesses, this 14th day of January, 1899.

PAUL THEODOR SIEVERT.

Witnesses:
 HERNANDO DE SOTO,
 PAUL ARRAS.